United States Patent
Streat

(10) Patent No.: US 10,629,192 B1
(45) Date of Patent: Apr. 21, 2020

(54) INTELLIGENT PERSONALIZED SPEECH RECOGNITION

(71) Applicant: Electronic Arts Inc., Redwood City, CA (US)

(72) Inventor: David Gershon Streat, Port Moody (CA)

(73) Assignee: ELECTRONIC ARTS INC., Redwood City, CA (US)

(*) Notice: Subject to any disclaimer, the term of this patent is extended or adjusted under 35 U.S.C. 154(b) by 144 days.

(21) Appl. No.: 15/866,375

(22) Filed: Jan. 9, 2018

(51) Int. Cl.
| | |
|---|---|
| G10L 15/187 | (2013.01) |
| G10L 15/22 | (2006.01) |
| G10L 15/02 | (2006.01) |
| G10L 15/06 | (2013.01) |
| G10L 25/51 | (2013.01) |
| G10L 15/30 | (2013.01) |
| A63F 13/22 | (2014.01) |
| A63F 13/424 | (2014.01) |
| A63F 13/215 | (2014.01) |

(52) U.S. Cl.
CPC ......... *G10L 15/187* (2013.01); *A63F 13/215* (2014.09); *A63F 13/22* (2014.09); *A63F 13/424* (2014.09); *G10L 15/02* (2013.01); *G10L 15/063* (2013.01); *G10L 15/22* (2013.01); *G10L 15/30* (2013.01); *G10L 25/51* (2013.01); *A63F 2300/1018* (2013.01); *A63F 2300/1081* (2013.01); *G10L 2015/025* (2013.01); *G10L 2015/0635* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,266,495 B1* | 9/2007 | Beaufays | G10L 15/06 704/236 |
| 7,369,997 B2 | 5/2008 | Chambers et al. | |
| 7,467,087 B1* | 12/2008 | Gillick | G10L 15/063 704/260 |
| 8,443,288 B2 | 5/2013 | Mercs | |
| 9,582,246 B2 | 2/2017 | Klein et al. | |
| 9,685,156 B2 | 6/2017 | Borjeson et al. | |
| 9,741,339 B2* | 8/2017 | Peng | G10L 15/18 |
| 10,134,390 B2* | 11/2018 | Shin | G10L 15/187 |
| 10,152,965 B2* | 12/2018 | Bruguier | G10L 15/065 |
| 2004/0266527 A1 | 12/2004 | Anderson et al. | |
| 2007/0244751 A1 | 10/2007 | Zalewski et al. | |
| 2008/0147404 A1* | 6/2008 | Liu | G10L 15/005 704/256.2 |
| 2010/0145704 A1* | 6/2010 | Conkie | G10L 15/063 704/260 |
| 2011/0086712 A1 | 4/2011 | Cargill | |
| 2011/0212783 A1 | 9/2011 | Dale et al. | |
| 2013/0031275 A1 | 1/2013 | Hanes | |
| 2013/0090169 A1 | 4/2013 | Liu et al. | |

(Continued)

*Primary Examiner* — Abul K Azad
(74) *Attorney, Agent, or Firm* — Knobbe, Martens, Olson & Bear, LLP

(57) ABSTRACT

The present disclosure provides a voice recognition system configured to generate a custom phoneme mapping for a user. The voice recognition system can analyze a user speech sample of a grammar training set in order to generate the custom phoneme mapping. The custom phoneme mapping can be used for subsequent recognition of the user's voice within an application.

20 Claims, 6 Drawing Sheets

(56) References Cited

U.S. PATENT DOCUMENTS

| | | |
|---|---|---|
| 2013/0315406 A1 | 11/2013 | Choi et al. |
| 2013/0325474 A1* | 12/2013 | Levien ................ G10L 15/065 704/251 |
| 2014/0128144 A1 | 5/2014 | Bavitz et al. |
| 2014/0181929 A1 | 6/2014 | Zheng et al. |
| 2015/0035937 A1 | 2/2015 | Ota |
| 2015/0111640 A1 | 4/2015 | Zheng |
| 2015/0248886 A1 | 9/2015 | Sarikaya et al. |
| 2016/0203002 A1 | 7/2016 | Kannan et al. |
| 2017/0052760 A1 | 2/2017 | Johnson et al. |
| 2017/0169829 A1 | 6/2017 | Celikyilmaz et al. |
| 2019/0001219 A1 | 1/2019 | Sardari et al. |
| 2019/0027131 A1 | 1/2019 | Zajac, III |

* cited by examiner

INTELLIGENT PERSONALIZED SPEECH RECOGNITION

BACKGROUND

Field

This disclosure relates to improving the accuracy and efficiency of speech recognition by computers.

Description of Related Art

Generic speech recognition models can be inaccurate when used to recognize words spoken by people with heavy accents or speech impediments. Also, speech recognition methods can be computationally intensive. For example, some smartphones lack the processing power to responsively perform voice calibration or voice recognition, and instead rely on transmitting speech samples to powerful servers in datacenters for analysis.

SUMMARY

The systems, methods, and devices in this disclosure each have several innovative aspects, no single one of which is solely responsible for all of the desirable attributes disclosed herein. Details of the one or more implementations of the subject matter described in this specification are set forth in the accompanying drawings and the description below.

Some aspects feature a video game system including: an audio input interface configured to receive audio data from one or more audio input devices, a display output configured for transmitting graphics data, a data store including computer-executable instructions, and a processor. The processor can be configured to execute the computer-executable instructions to perform a method including: determining a first phoneme mapping for each letter or combination of letters in a grammar training set, receiving audio data comprising a speech sample of a user reading a grammar training set, recognizing the speech sample using the first phoneme mapping, determining a first confidence score indicative of how accurately the grammar training set is recognized using the speech sample using the first phoneme mapping, changing the first phoneme mapping to generate a mutated phoneme mapping until a confidence score generated using the mutated phoneme mapping satisfies a defined confidence threshold, and storing the mutated phoneme mapping that satisfies the defined confidence threshold in a profile for the user in a data store.

The video game system can further have any combination of the following features. The processor can be configured to execute the computer-executable instructions to perform the method further comprising: receiving information indicative of an accent of the user, and selecting the first phoneme mapping based on the information indicative of an accent. The information indicative of an accent can include at least one of: an age of the user; a gender of the user; a current location of the user; or a location where the user lived. The processor can be configured to execute the computer-executable instructions to perform the method further comprising: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and based at least in part on the comparison of the second confidence score to the first confidence score, undoing a previous mutation and performing a different mutation to generate the mutated phoneme mapping. Changing the first phoneme mapping to generate the mutated phoneme mapping until the confidence score generated using the mutated phoneme mapping satisfies the defined confidence threshold can include: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and determining that the grammar training set is more accurately recognized using the mutated phoneme mapping as compared to using the first phoneme mapping. Changing the first phoneme mapping can include randomly changing one or more phoneme mappings. The first confidence score can be a per phoneme confidence score.

Some aspects feature a method for voice recognition as implemented by a computing system configured with specific computer-executable instructions, the method comprising: receiving a grammar training set, receiving a speech sample of a user reading at least a first portion of the grammar training set, determining a first phoneme mapping for each letter or combination of letters in the first portion of the grammar training set, recognizing the speech sample using the first phoneme mapping, determining a first confidence score indicative of how accurately the recognized speech sample corresponds to the first portion of the grammar training set by using the first phoneme mapping, changing the first phoneme mapping to generate a mutated phoneme mapping until a confidence score generated using the mutated phoneme mapping satisfies a defined confidence threshold, and storing the mutated phoneme mapping that satisfies the defined confidence threshold in a profile for the user in a data store.

The method can further include any combination of the following. The method can further include receiving information indicative of an accent of the user, and selecting the first phoneme mapping based on the information indicative of an accent. The information indicative of an accent includes at least one of: an age of the user, a gender of the user, a current location of the user, or a location where the user lived. The method can further include: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and based at least in part on the comparison of the second confidence score to the first confidence score, performing a different mutation to generate the mutated phoneme mapping. Changing the first phoneme mapping to generate the mutated phoneme mapping until the confidence score generated using the mutated phoneme mapping satisfies the defined confidence threshold can include: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and determining that the grammar training set is more accurately recognized using the mutated phoneme mapping as compared to using the first phoneme mapping. Changing the first phoneme mapping can include randomly changing one or more phoneme mappings. The method can further include: after storing the mutated phoneme mapping in the profile for the user, receiving a new voice command from the user, performing voice recognition of the new voice command using the mutated phoneme mapping, and detecting a word in the new voice command, wherein the word is not included in the grammar training set.

Some aspects feature a non-transitory, computer-readable storage medium storing computer readable instructions that, when executed by one or more computing devices, causes the one or more computing devices to perform operations comprising: receiving, through a network connection port, a speech sample of a user reading a grammar training set, determining a first phoneme mapping for each letter or combination of letters in the grammar training set, recognizing the speech sample using the first phoneme mapping, determining a first confidence score indicative of how accurately the grammar training set is recognized using the speech sample using the first phoneme mapping, changing the first phoneme mapping to generate a mutated phoneme mapping until a confidence score generated using the mutated phoneme mapping satisfies a defined confidence threshold, and storing the mutated phoneme mapping that satisfies the defined confidence threshold in a profile for the user in a data store.

The computer-readable storage medium can feature any combination of the following. The computer readable instructions are further configured to cause the one or more computing devices to perform operations including receiving information indicative of an accent of the user, and selecting the first phoneme mapping based on the information indicative of an accent. The information indicative of an accent can include at least one of: an age of the user, a gender of the user, a current location of the user, or a location where the user lived. The computer readable instructions are further configured to cause the one or more computing devices to perform operations comprising: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and based at least in part on the comparison of the second confidence score to the first confidence score, undo a previous mutation and performing a different mutation to generate the mutated phoneme mapping. Changing the first phoneme mapping to generate the mutated phoneme mapping until the confidence score generated using the mutated phoneme mapping satisfies the defined confidence threshold can include: changing a phoneme associated with one or more letters in the grammar training set, recognizing the speech sample using the mutated phoneme mapping, determining a second confidence score based on an analysis of the speech sample using the mutated phoneme mapping, comparing the second confidence score to the first confidence score, and determining that the grammar training set is more accurately recognized using the mutated phoneme mapping as compared to using the first phoneme mapping. The first confidence score can be a per word confidence score.

DETAILED DESCRIPTION

Overview

Computing systems, such as video game consoles, personal computers, and smartphones can recognize voice commands. Some systems may attempt to recognize spoken phonemes and then determine one or more words based on the spoken phonemes. However, individuals pronounce words differently. A person speaking English with a Jamaican accent sounds different from a person speaking English Chinese accent, which sounds different from person speaking English with a German accent, which sounds different from a person speaking English with a Scottish accent. Even within a country, accents can differ. A New England accent sounds different from a Southern US accent, which sounds different from a West Coast accent.

In some embodiments disclosed herein, a personal phoneme mapping is determined for each user. The user is presented with a grammar training set to read out loud, and based on the reading, a phoneme mapping is determined for the user. The phoneme mapping can capture accents and other pronunciation variations, such as lisps or speech impediments. During runtime of the game application, the voice recognition system can use the phoneme mapping for that user to increase accuracy of voice recognition.

In some embodiments, the analysis can be performed by a computing cluster in a server or data center. However, in some other embodiments, the analysis can be performed by a user computing system, such as a video game console, a personal computer, laptop, or smartphone. User computing systems may have limited processing capabilities, which may take too long to implement advanced individual voice training techniques. Some methods disclosed herein can quickly perform phoneme mapping, even on resource-constrained computing systems.

As used herein, a phoneme may be indicated by letters or symbols included between a pair of slashes, such as the phoneme /a/. Letters or words may be indicated with quotation marks such as the letter "a."

Example Voice Recognition

Figure 1:
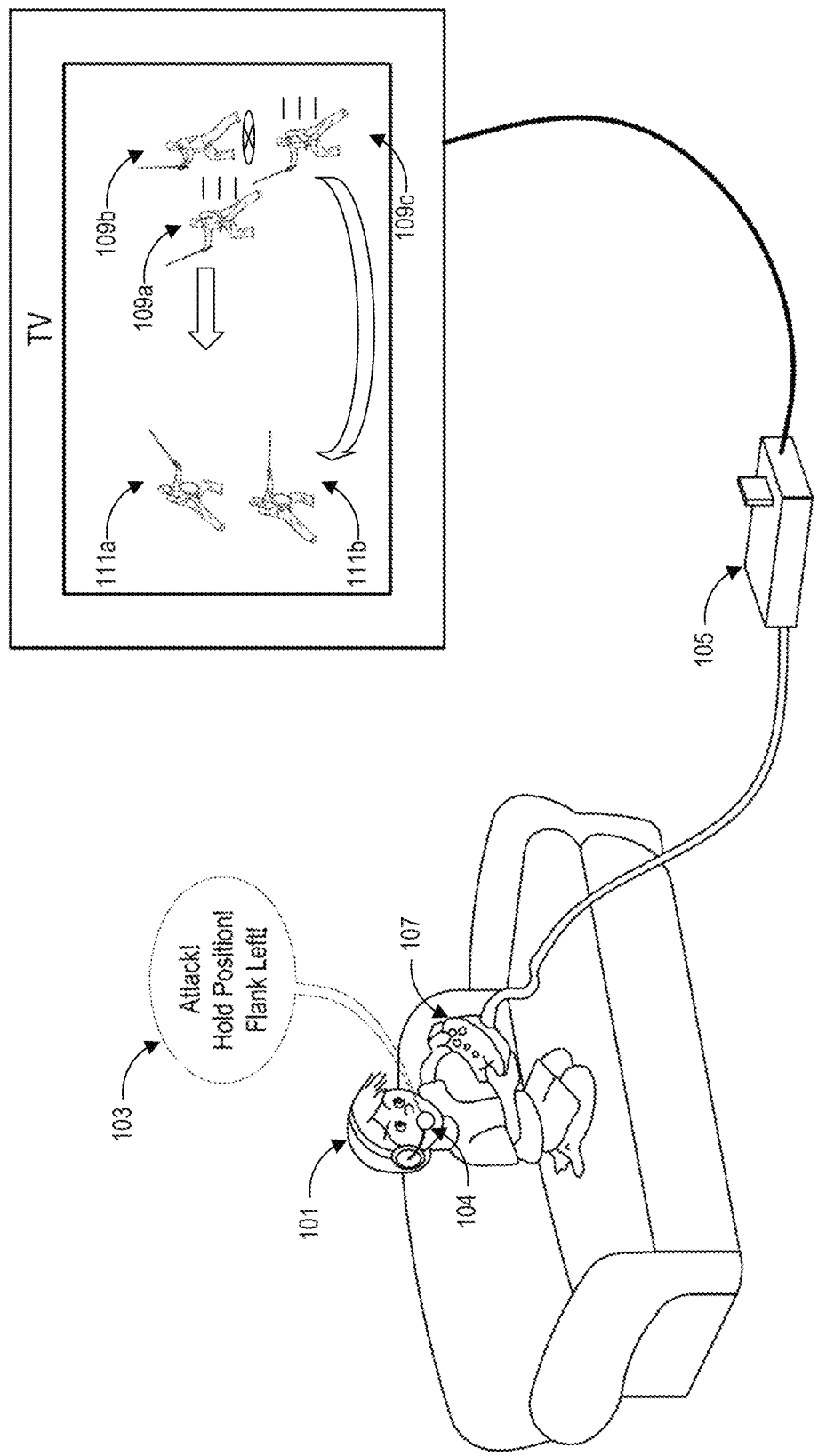
FIG. 1 shows an example of a user speaking voice commands to a computing system.

FIG. 1 shows an example of a user 101 speaking voice commands 103 to a computing system 105, such as a video game console, by speaking into a microphone 104. In response to the voice commands 103, the computing system 105 can respond, such as by having virtual characters in a video game application perform responsive actions. The computing system 105 can also respond to user inputs provided by an input device 107 (for example, a controller), such as when the user presses buttons or moves joysticks.

When the computing system 105 receives each voice command 103, the computing system 105 can analyze the voice command to determine what the user 101 is saying. The sounds in the voice command 103 can be matched to phonemes. Based on the sequence of phonemes and the letters or letter combinations mapped to the sequence of phonemes, the computing system 105 can determine which words the user 101 is speaking. The determined words can be matched to a defined set of commands associated with the game application, which can also be referred to as a grammar specification. The computing system 105 can then execute the commands corresponding to the determined words.

For example, the computing system 105 is executing a video game application, and three virtual characters 109a-109c controlled by the user confront two other virtual characters 111a, 111b. The user 101 says, "Attack," and the microphone 104 converts the spoken sound waves into electronic signals that are transmitted to the computing system 105. The computing system 105 can analyze the electronic signals to determine which phonemes were spoken. Based on the series of phonemes, the computing system 105 can determine that the "Attack" command was spoken, and cause the virtual character 109a to perform the corresponding attack action within the game application. Similarly, when the user says, "Hold position," the computing system can determine which phonemes were spoken, determine that the "Hold position" command was spoken based on the phonemes, and then cause the virtual character 109b to perform the corresponding hold position action within the game application. Similarly, when the user says, "Flank left," the computing system can determine which phonemes were spoken, determine that the "Flank left" command was spoken based on the phonemes, and then cause the virtual character 109c to flank from the left side within the game application.

The accuracy of voice recognition can vary. Some systems are configured to recognize a word, such as the word "Attack," when a combination of phonemes is detected. However, depending on who speaks the word, it may sound very different, which can cause the accuracy of the voice recognition system to be lower. For example, people speak with different accents, different habits, speech impediments, and/or other speech mannerisms that affect the phonemes spoken by an individual for a specific word.

The accuracy of voice recognition can be improved by personalizing the phonemes that map to different words. For people with different accents, different phoneme combinations can be used to detect the same word (such as "attack"). At one level of phoneme personalization, a user can provide information about their accent (such as age, gender, current location, past locations, languages, and the like). Based on the information, a default phoneme mapping for the user's accent can be used.

The accuracy of voice recognition can additionally or alternatively be improved by creating a personal phoneme mapping for the user. The user can be prompted to read a grammar training set, which includes words pronounced by speaking a variety of phonemes. For example, the grammar training set can include individual words, sentences, and/or paragraphs, to provide the voice recognition system with a diverse set of phonemes for the user to pronounce. Based on how the user pronounces the words, a personal phoneme mapping can be created for the user, such as further described with respect to FIG. 5. The phoneme map can be stored in a user profile and can be used to detect speech for the game application. The phoneme map may be used in a plurality of different applications or for different video games. As further discussed with respect to FIG. 5, determining a phoneme mapping can include mutating the phoneme mapping until a threshold confidence score for voice recognition is reached.

Figure 2:
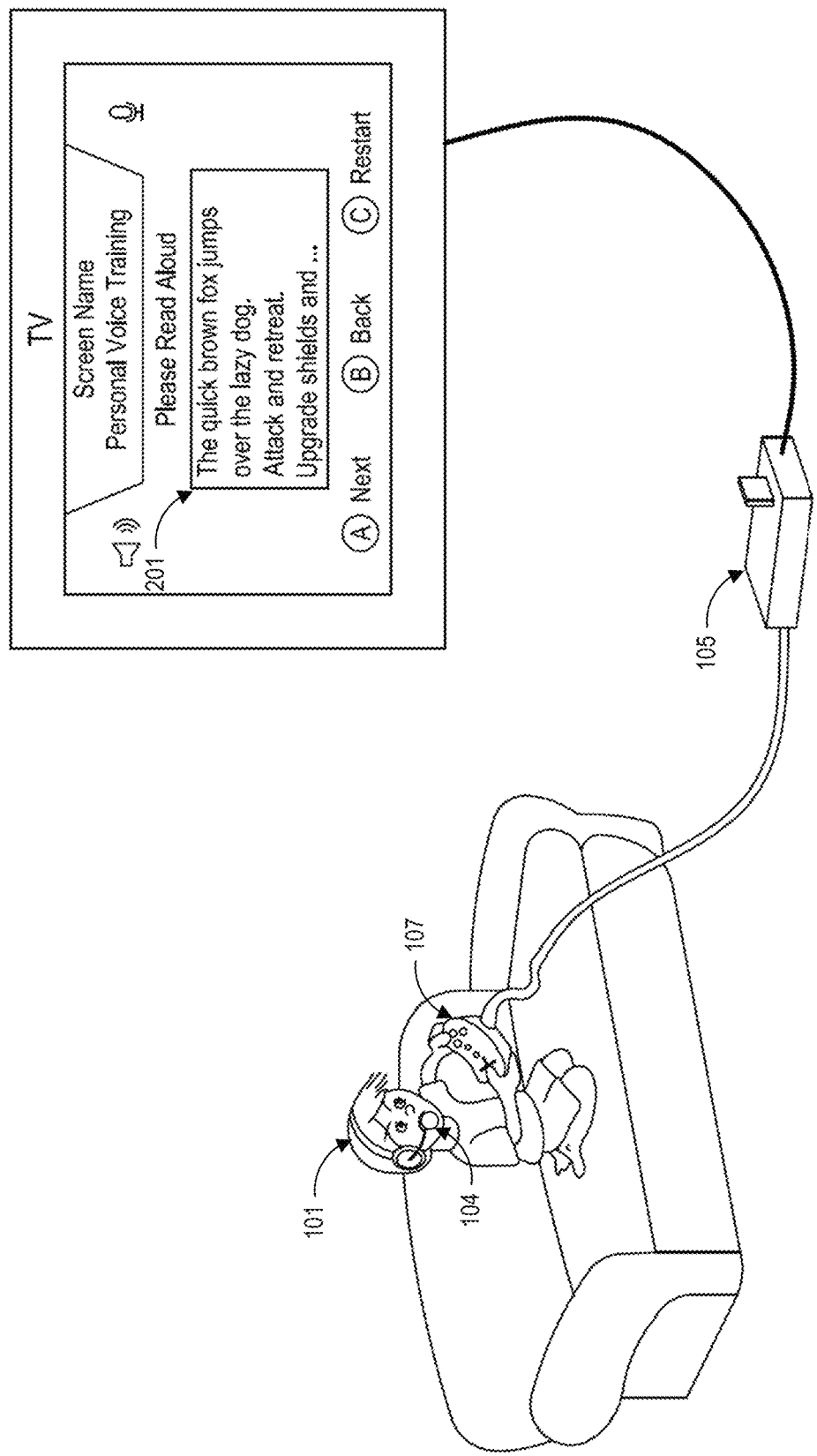
FIG. 2 shows an example of the user reading a grammar training set to improve voice recognition.

FIG. 2 shows an example of the user reading a grammar training set to generate a phoneme map. From a menu, the user 101 can select an option to perform voice recognition training. In response, the computing system can cause grammar training set 201 to be displayed in the form of text on a screen. The user 101 can read the grammar training set 201, and the microphone 104 can provide an electronic signal to the computing system 105.

In some embodiments, the text of the grammar training set can include a plurality of phonemes. The text can additionally or alternatively include different letters (such as the letters a-z), different combinations of letters (such as the letter combinations "th," "st," "-ing," and the like), and the same letter or letters pronounced in different ways (such as the first letter "a" and the second letter "a" in "attack"), and the same letter or letters pronounced the same way in different words. In some embodiments, the text can include specific command included within a grammar specification for an application. For example, if the words "attack," "flank," "left," "right," and "hold position" are recognized in an application, then those specific words can be included in the training text.

Example System for Mapping Phonemes

Figure 3:
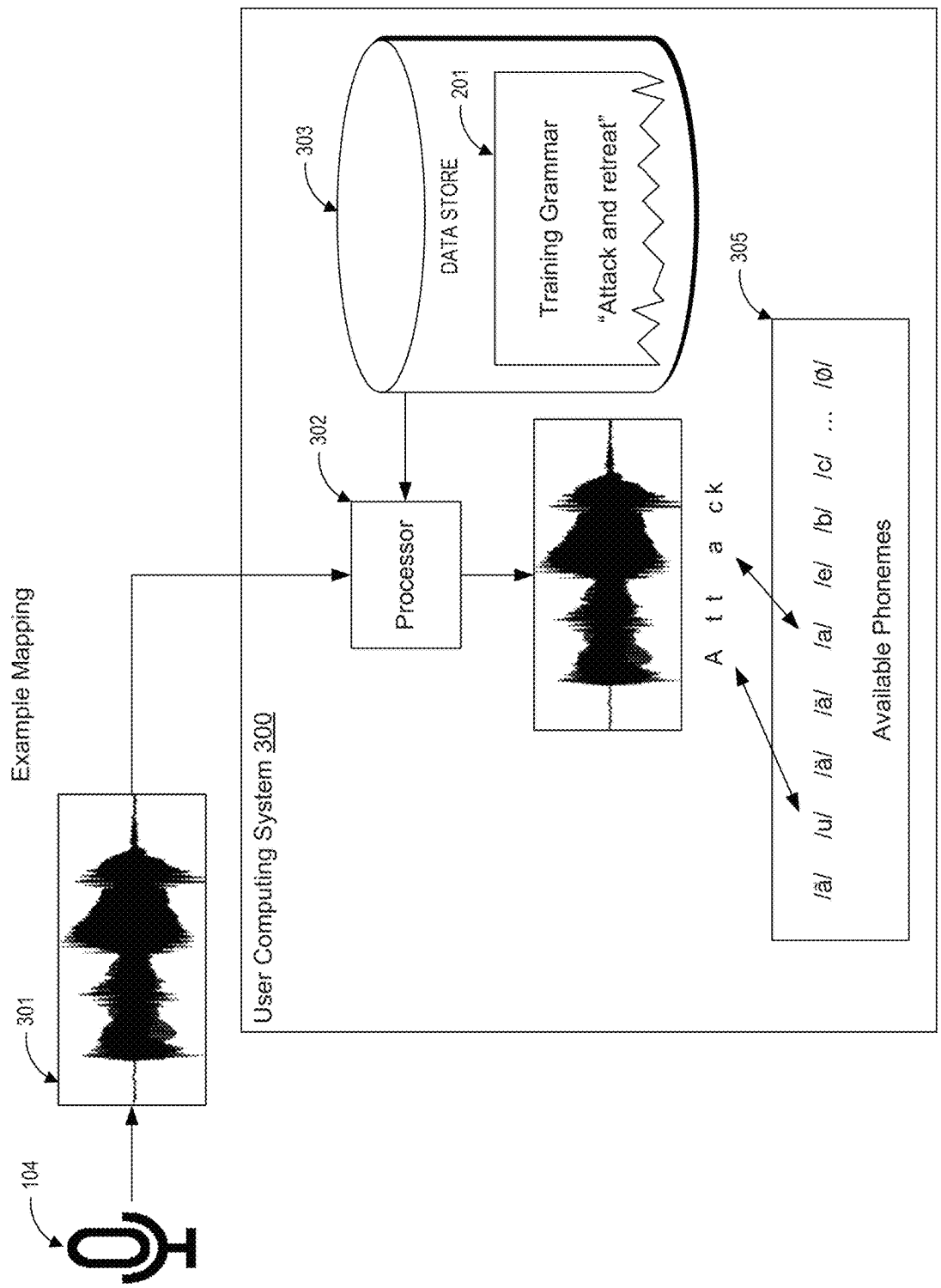
FIG. 3 shows an example system for mapping phonemes.

FIG. 3 shows an example system for mapping phonemes. A microphone 104 records a speech sample 301 and transmits the speech sample 301 to a user computer system 300 (such as the console 105 in FIG. 1 and FIG. 2). The user computer system includes a processor 302 and a data store 303 that stores the grammar training set 201. The processor analyzes the speech sample 301 to determine a mapping to available phonemes 305.

In some embodiments, the speech sample 301 can be recorded by a microphone 104 and transmitted through a network to a network-based computing system. For example, the user computing system 300 may have too little processing capability to responsively analyze the speech sample. The user computing system 300 can transmit the speech sample 301 through the network to a server or more powerful computing system, which can perform the phoneme mapping. The server or more powerful computing system can then transmit, through the network, the results of the phoneme mapping back to the user computing system 300.

A user may provide the speech sample 301 when prompted to read the grammar training set 201, such as shown in FIG. 2. The speech sample 301 can be recorded by a microphone 104. The microphone 104 can be, for example, part of a headset. The microphone 104 can transmit the speech sample 301 to the user computing system 300. In various embodiments, the microphone can 104 wirelessly transmit the speech sample 301 or transmit the speech sample 301 via one or more wired connections.

The processor 302 can compare the speech sample to the defined words within the grammar training set 201. As further described with respect to FIG. 4 and FIG. 5, the processor 302 can analyze the speech sample 301 to determine a phoneme mapping. The phoneme mapping can indicate how the user pronounces letters or letter combinations. Each letter or combination of letters in the grammar training set can be mapped to an available, known phoneme 305. The frequency characteristics of the available phonemes 305 can be stored in a data store 303.

For example, the processor 302 can determine that the user pronounces the first "A" in "Attack" with the /u/ phoneme, and the processor 302 can determine that the user pronounces the second "a" in "Attack" with a different /a/ phoneme. The phoneme mapping can also include a mapping of the "tt" and "ck" sounds in "Attack," and for all other letters and letter combinations in the grammar training set 201. The available phonemes 305 can also include phonemes to recognize emphasis variations, short pauses such as /'/, longer silences such as /Ø/, and other sounds.

Figure 4:
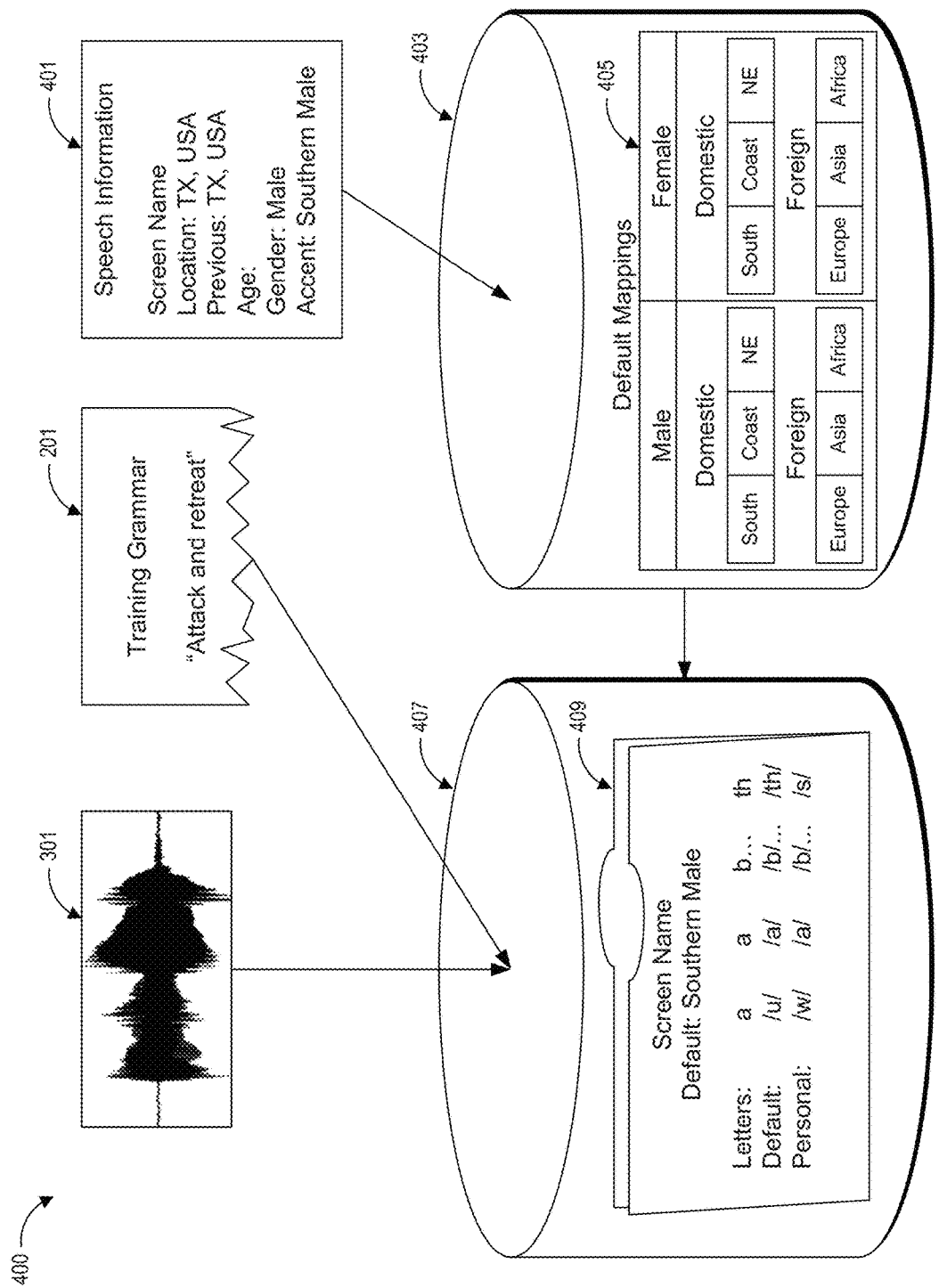
FIG. 4 shows an example system including a phoneme mapping for a user.

FIG. 4 shows an example system 400 including a phoneme mapping for a user. The system 400 includes speech sample 301, a grammar training set 201 that corresponds to the speech sample 301, speech information 401 about a user, a first data store 403 of default phoneme mappings 405, and a second data store 407 including the phoneme mapping 409 determined for the user. The default phoneme mappings 405 in the first data store 403 and the phoneme mapping 409 in the second data store 407 may be stored same physical data store, or may be stored in different data stores.

The speech information 401 can be collected for a user. The speech information 401 can include data about where the user is currently located, where the user lived, the user's age, the user's gender, and the like. A default accent can be determined for the user based at least in part on the speech information 401. For example, if the user is male, grew up in Texas, and currently lives in Texas, then a southern US male accent can be determined. As another example, a man who lives in Texas but formerly lived in Scotland can be determined to have a Scottish accent.

The speech information 401 can be collected in a variety of ways. For example, the user can input data in response to questions in a form or menu. As another example, the user can be prompted to verbally answer questions about their speech information as part of the voice recognition training. In some embodiments, the data can be collected about the user through other applications. For example, the user may have provided personal information (such as their address) as part of registering for a gaming platform with a username. When the user uses the same username to log into a particular game, that user's profile including their address can be accessed and used to determine a default accent for the user. As another example, a user's current location can be determined based on an IP address used by the user to connect to a network. As another example, the user's current accent or location can be determined based on whether they are running software applications that have a language configuration set to English, French, Italian, or other language.

The first data store 403 can include a plurality of default phoneme mappings 405 that can be selected for a user. There can be separate default phoneme mappings 405 for male voices and female voices. There can be default phoneme mappings 405 for foreign and domestic accents. Domestic accents can include, for example, a southern US accent, a coastal US accent, a north eastern US accent, and the like. Foreign accents can include, for example, European accents, Asian accents, African accents, and the like. The foreign accents can also be determined at the country, sub-country, or other regional level. The foreign accents can include defaults for Scottish accents, Australian accents, and the like. Each phoneme mapping for an accent can be unique from other phoneme mappings for other accents.

A phoneme mapping 409 can be determined for the user. The phoneme mapping can include a plurality of letters (such as "a," "b," "c") and letter combinations (such as "-ing," "th," "st," "ch," and the like). In some embodiments, the phoneme mapping can include a default phoneme determined for each of the letters and each of the letter combinations. The default phoneme can be a phoneme mapping 405 for an accent. The phoneme mapping can additionally or alternatively include a personal phoneme mapping. The personal phoneme mapping can be determined based at least in part on an analysis of the speech sample 301. An example analysis is further described with respect to FIG. 5.

In some embodiments, a phoneme mapping 409 for the user can be based on both default mappings 405 and based on the analysis of the speech sample 301. In some embodiments, a grammar training set 201 is not comprehensive and is not long enough to include every uniquely pronounced letter or combination of letters. A user may be discouraged or too impatient to read a long grammar training set, or the user may stop reading the grammar training set partway through. The grammar training set 201 can be designed to be short enough that most users will read the entire grammar training set, and the grammar training set can include the most common sounds and/or most difficult sounds to recognize. Where available, the speech sample 301 can be analyzed against the grammar training set 201 to determine a personal phoneme based on how the user pronounced each letter or combination of letters in the grammar training set. For letters or combinations of letters not included in the grammar training set, a default mapping for an accent can be used.

In some embodiments, phoneme mappings are not unique or distinct. For example, a user may speak the /u/ phoneme when reading the letters "a," "e," and "u" in various words. As another example, a user with a lisp may pronounce the letters "th" and "s" with the same phoneme.

Example Flowchart for Analyzing a Speech Sample

Figure 5:
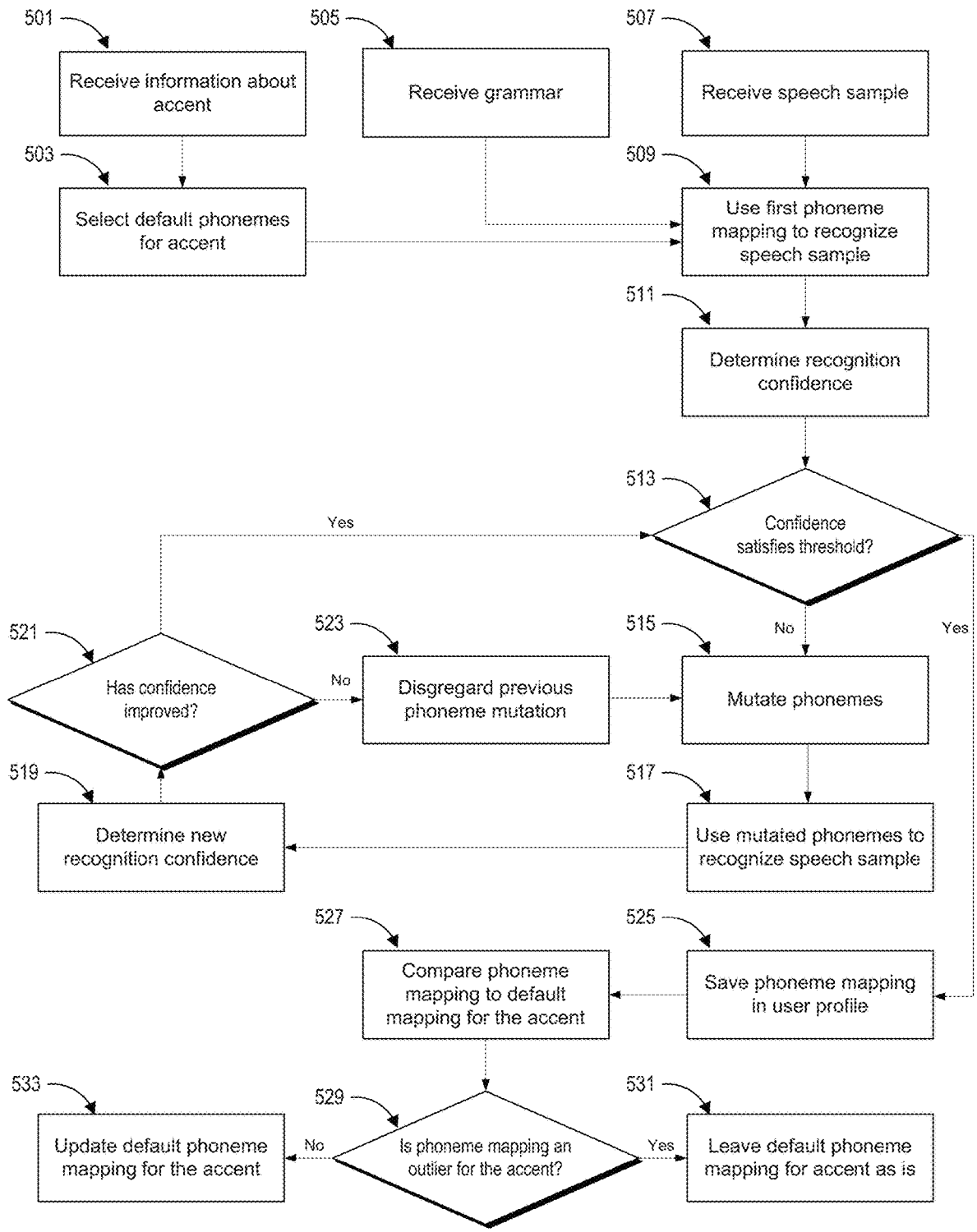
FIG. 5 shows a block diagram of an example flowchart for analyzing a speech sample to generate a phoneme mapping.

FIG. 5 shows a block diagram of an example flowchart for analyzing a speech sample to generate a phoneme mapping. Analyzing speech through some techniques can be computationally intensive. Some systems with limited processing power may not be able to quickly perform certain frequency analysis techniques. The flowchart provides a less computationally intensive way to recognize accents and voices that can be performed faster on systems with limited processing power, such as consoles. The techniques discussed with respect to FIG. 5 can also be performed by larger scale computer systems to improve efficiency and responsiveness.

At block 501, user information can be received. The information can include, for example, the speech information 401 discussed with respect to FIG. 4 such as language, gender, and location, among others. A system can be configured to determine information about the user's accent, based at least in part on the received user information.

At block 503, a default phoneme mapping can be selected for a user based at least in part on the user information. The system can be configured to access the default phoneme mapping from a data store. The phoneme mapping can be associated with the specific accent. For example, a default phoneme mapping can include mapping the phonemes /a/, /ã/, /ä/, /ā/, /u/, and /e/ to the letter "a" such that the letter "a" can be recognized if /a/, /ã/, /ä/, /ā/, /u/, or/e/ are detected. The phonemes can also be mapped to different letters. For example, the/e/ phoneme can be mapped to the letters "a," "e, and "i."

At block 505, a grammar training set can be received, such as from a data store, a remote server, a video game media like a DVD or cartridge, or the like. The user can be prompted to read the grammar training set aloud. The grammar training set can include a plurality of letters and letter combinations. The grammar training set can also include repeats of the same letter or combination of letters. The grammar training set may include phrases or words associated with defined commands within the application. For example, for a game application, the grammar training set may include, "Attack and retreat."

At block 507, a speech sample can be received. The speech sample can be a sample of the user reading the grammar training set. The user may have particular ways of speaking that vary from the default phoneme mapping. For example, the user's speech sample of reading "Attack" can sound like: /w/ /t/ /a/ /k/.

At block 509, a first phoneme mapping can be used to recognize the speech sample. The first phoneme mapping can be a random mapping or can be the phoneme mapping associated with the accent. The system can be configured to use voice recognition to recognize the speech sample based on the first phoneme mapping. In some embodiments, the recognition can include additional heuristics, such as whether the recognized words make sense in the context of a sentence.

For example, the first phoneme mapping can include a mapping of /w/ to the letters "w" or "wha," a mapping of /t/ to the letters "t" and to "tt," a mapping of /u/ to the letter "a," and a mapping of /k/ to "k" and to "ck," in addition to default mappings for other phonemes and letters. However, in the first phoneme mapping, /w/ is not mapped to the letter "a." Based on the first phoneme mapping, voice recognition can determined that the user spoke "whattack" or "wttack," which can be compared to "Attack" in the grammar training set.

At block 511, a recognition confidence score can be determined. Determining the recognition confidence score can include comparing the recognized words, letters, or phonemes from block 509 to the words, letters, or phonemes in the grammar training set. The recognition confidence score can be improved when correct words, letters, or phonemes of the grammar training set are recognized. Various embodiments can determine recognition confidence scores per phoneme, per letter, per word, or based on point to point comparisons of audio samples.

In some embodiments, a recognition confidence score can be determined by comparing a recorded speech sample against one or more audio samples. The one or more audio samples can include a collection of audio samples representing each phoneme strung together to form the mapped words in the grammar training set. A comparison, such as a point to point comparison, of the recorded speech sample can be performed to see phonemes or smaller audio snippets more closely match the recorded speech sample. A high confidence score can indicate closer point to point comparisons.

As an example, a per phoneme recognition confidence score can be determined for the four phonemes /u/ /t/ /a/ /k/. Based on the speech sample of /w/ /t/ /a/ /k/, the first spoken phoneme is not recognized as the correct phoneme, but the /t/, /a/, and /k/ phonemes are correctly mapped, so the recognition confidence score can be 75%.

As an example, a per letter phoneme recognition confidence score can be determined for the letters in "Attack" when the speech sample includes the phonemes /u/ /t/ /a/ /k/. The voice recognition software can detect that a possible match is "whattack," which has 6 correct letters and two incorrect letters, so the recognition confidence score can be about 75%. Alternatively, "wttack" can be recognized as having 5 of 6 correct letters, or about 83% recognition confidence score.

As an example, a per word recognition confidence score can be determined for the word "Attack" when the speech sample includes the phonemes /w/ /t/ /a/ /k/. No combination of the letters mapped to those phonemes are a recognized word, so the recognition confidence score for the word "Attack" is 0%. If the two subsequent words "and retreat" are correctly recognized, then the recognition confidence score can increase to about 66%.

At block 513, a comparison can be performed to determine if the recognition confidence score satisfies a threshold confidence score. If so, then block 513 can proceed to block 525. Otherwise, block 513 can proceed to block 515. A threshold confidence score can be, for example, 75%, 80%, 90%, 95%, or any value.

At block 515, the phoneme mapping can be mutated. For example, the /w/ phoneme may have been mapped to the letter "w," but can be mutated and changed to additionally map to the letter "a." The mappings to the first letter "A" are therefore changed to include /w/ in addition to default mappings such as /a/, /ă/, /ä/, /ā/, /u/, and /e/. In some embodiments, the phoneme mapping mutations can be random. One or more phonemes from a set of available phonemes can be randomly associated with one or more letters or letter combinations. One or a plurality of phoneme mappings can be mutated at block 515. Accordingly, the system can be configured to mutate the phoneme mapping to change at least one mapping between a phoneme and a letter or letter combination. The changes can include removing or adding associations between phonemes and a letter or letter combination.

At block 517, the mutated phonemes can be used to recognize the speech sample. For example, if at block 515 the phoneme /w/ was mutated to map to any of the letters "w," "wha," and "a," then by using voice recognition based on the mutated phoneme, the speech sample of /w/ /t/ /a/ /k/ could be recognized as "attack."

At block 519, a new recognition confidence score can be determined based on the new phoneme mapping, similar to how the recognition confidence score was determined at block 511. The system can be configured to use speech recognition based on the mutated phoneme to recognize words, letters, or phonemes and compared the recognized words, letters or phonemes to the grammar training set. By including a mutated phoneme mapping of /w/ to "a," the word "attack" can be recognized and compared to the word "Attack" from the grammar training set. The recognition confidence score would increase to 100% under any of the per phoneme, per letter, and per word recognition confidence score schemes described in the three examples above.

At block 521, it can be determined if the recognition confidence score improved compared to the previous phoneme mapping, thereby indicating if the mutation of the phoneme at block 515 was beneficial to improving voice recognition. In a first loop, the new recognition confidence score at block 519 can be compared to the recognition confidence score from block 511. After at least one loop of blocks 513, 515, 517, 519, and 521, the recognition confidence score at block 519 can be compared a recognition confidence score at block 519 that was determined during the previous loop.

If the recognition confidence score improved, then block 521 can proceed to block 513. Otherwise, if the recognition confidence score did not improve, then at block 523, the previous phoneme mutation can be undone or reversed, and at block 515, a different phoneme mutation can be performed.

Blocks 513, 515, 517, 519, and 521 can form a loop wherein the mutation of phonemes iteratively improves the voice recognition. If during a first time that block 515 is performed, a mutation of a first phoneme improves the recognition confidence score at blocks 519 and 521, but the threshold confidence score is not yet satisfied at block 513, then during the next time block 515 is performed, a different second phoneme that did not previously contribute to the improved recognition confidence score can be mutated. If a phoneme mutation at block 515 does not improve a recognition confidence score or decreases the recognition confidence score, then that phoneme mutation that was last performed at block 515 can be disregarded at block 523 and the process can continue to block 515 to perform a different mutation. Blocks 515, 517, 519, 521, and 523 can form a second loop wherein different phoneme mutations are attempted until the recognition confidence score increases.

The loop including blocks 513, 515, 517, 519, and 521 can be performed until the threshold confidence score is satisfied at block 513, indicating that the voice recognition can accurately recognize the user's speech sample.

At block 525, the mutated phonemes can be saved as a phoneme mapping associated with a user profile, such as shown in FIG. 4. After performing voice calibration using the grammar training set, when the user speaks a voice command to the system such as shown in FIG. 1, the voice recognition can use the phoneme mapping associated with the user's profile to recognize the command.

The voice recognition can be more accurate, even for words not included in the grammar training set. For example, based on speaking the grammar training set, the phoneme mapping associated with the user's profile may indicate that the user speaks a /w/ sound when a letter "A" is normally pronounced with a /u/, such as at the beginning of the word "Attack." When the user speaks a different word not included in the grammar training set, such as the word "Avoid," the user may speak the sounds /w/ /ʼ/ /v/ /ɔ ɪ/ /d/. Based on the phoneme mapping for the user's profile, the /w/ can be accurately recognized as the letter A in the word "Avoid" instead of recognizing only "w" or "wha."

In some embodiments, blocks 527 through 533 can be used to further update a default phoneme profile. As more speech samples are collected from people with different accents, the default accents can be improved to more accurately reflect the pronunciations by large groups of people.

At block 527, the phoneme mapping for the user can be compared to the default phoneme mapping for an accent to determine if the phoneme mapping for the user is an outlier compared to the phoneme mapping for the default accent.

At block 529, it can be determined if the phoneme mapping for the user is an outlier that is different from the default mapping by more than a threshold deviation. Then, block 529 can proceed to block 531 or to block 533.

At block 531, if the phoneme mapping is determined to be an outlier, then the default phoneme mapping for the user's accent can be left as-is.

At block 533, if the phoneme mapping is determined to not be an outlier, then at block 533, the default phoneme mapping can be updated based at least in part on the phoneme mapping for a user.

The flowchart described with respect to FIG. 5 can be used by many types of computer systems to calibrate voice recognition faster than other techniques. Some voice recognition techniques use computationally intensive processes to analyze speech. However, randomly mutating phonemes, such as described with respect to block 515, can produce faster results when implemented in the context of FIG. 5.

Example Hardware Configuration of Computing System

Figure 6:
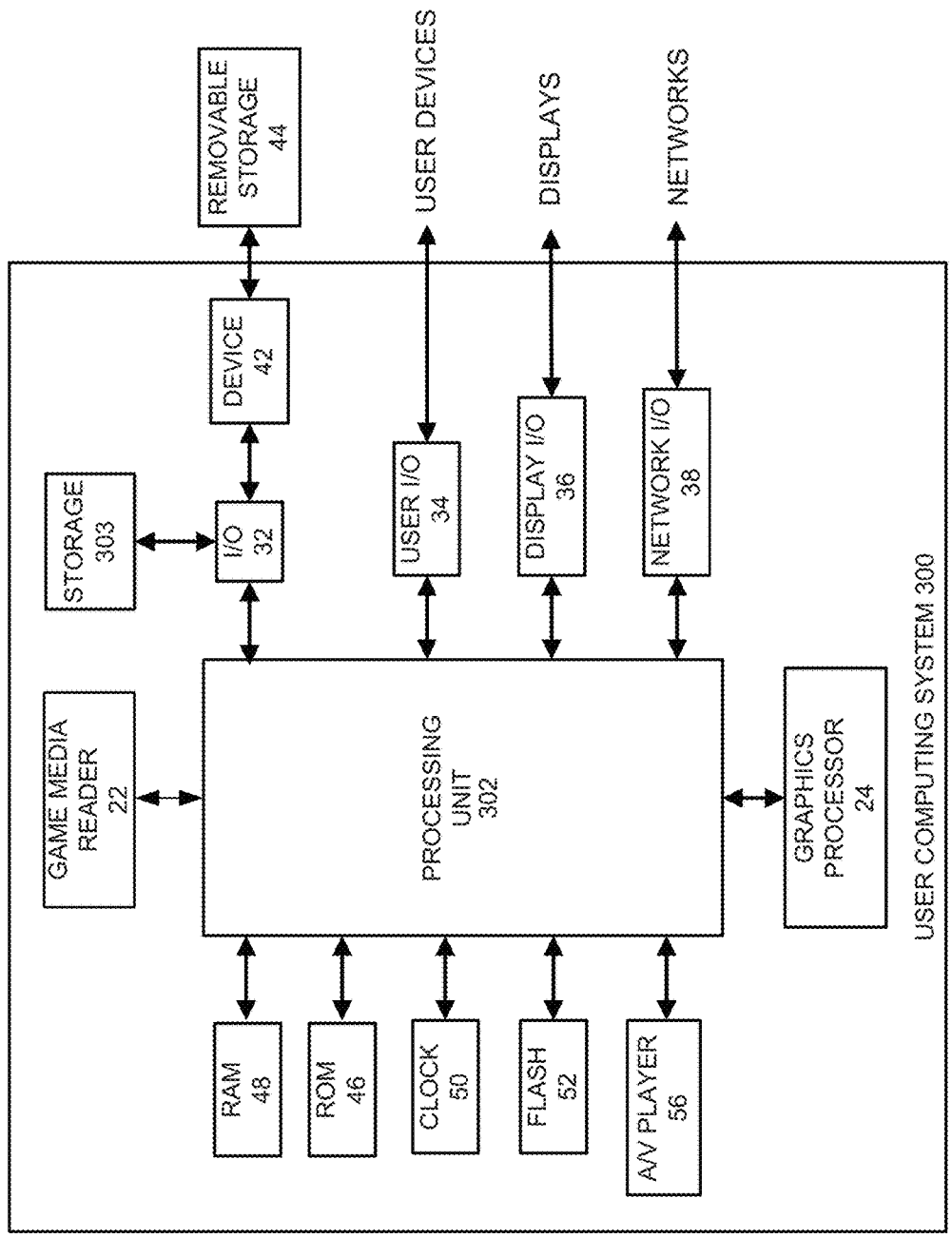
FIG. 6 shows a block diagram of an example computing system

FIG. 6 illustrates an embodiment of a hardware configuration for the computing system 300 of FIG. 3. Other variations of the computing system 300 may be substituted for the examples explicitly presented herein, such as removing or adding components to the computing system 300. The computing system 300 may include a computer, a server, a smart phone, a tablet, a personal computer, a desktop, a laptop, a smart television, and the like.

As shown, the computing system 300 includes a processing unit 302 that interacts with other components of the computing system 300 and also components external to the computing system 300. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 300 may include a separate graphics processor 24. In some cases, the graphics processor 24 may be built into the processing unit 302, such as with an APU. In some such cases, the graphics processor 24 may share Random Access Memory (RAM) with the processing unit 302. Alternatively, or in addition, the computing system 300 may include a discrete graphics processor 24 that is separate from the processing unit 302. In some such cases, the graphics processor 24 may have separate RAM from the processing unit 302. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 300 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 303 and, through a device 42, removable storage media 44 in order to provide storage for the computing system 300. The storage element 303 can store a database that includes the failure signatures, clusters, families, and groups of families. Processing unit 302 can communicate through I/O 32 to store data, such as game state data and any shared data files. In addition to storage 303 and removable storage media 44, the computing system 300 is also shown including ROM (Read-Only Memory) 46 and RAM 48. RAM 48 may be used for data that is accessed frequently, such as when a game is being played, or for all data that is accessed by the processing unit 302 and/or the graphics processor 24.

User I/O 34 is used to send and receive commands between processing unit 302 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 300 on a display device, such as graphics, user interfaces, video, and/or other visual content. The computing system 300 may comprise one or more integrated displays configured to receive display output signals produced by the display I/O 36, which may be output for display to a user. According to some embodiments, display output signals produced by the display I/O 36 may also be output to one or more display devices external to the computing system 300.

The computing system 300 can also include other features that may be used with a game, such as a clock 50, flash memory 52, and other components. An audio/video player 56 might also be used to play a video sequence, such as a movie. It should be understood that other components may be provided in the computing system 300 and that a person skilled in the art will appreciate other variations of the computing system 300.

Program code can be stored in ROM 46, RAM 48, or storage 303 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 303, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 300 is turned off or loses power.

As computing system 300 reads game media 12 and provides a game, information may be read from game media 12 and stored in a memory device, such as RAM 48. Additionally, data from storage 303, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 302 or distributed among several media, such as game media 12 and storage 303.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A video game system comprising:
   an audio input interface configured to receive audio data from one or more audio input devices;
   a display output configured for transmitting graphics data;
   a data store including computer-executable instructions; and
   a processor configured to execute the computer-executable instructions to perform a method comprising:
      determining a first phoneme mapping for each letter or combination of letters in a grammar training set;
      receiving audio data comprising a speech sample of a user reading a grammar training set;
      recognizing the speech sample using the first phoneme mapping;
      determining a first confidence score indicative of how accurately the grammar training set is recognized using the speech sample using the first phoneme mapping;
      changing the first phoneme mapping to generate a mutated phoneme mapping until a confidence score generated using the mutated phoneme mapping satisfies a defined confidence threshold;
      storing, in a user profile in the data store, the mutated phoneme mapping that satisfies the defined confidence threshold, wherein the mutated phoneme mapping is associated with the user in the user profile;
      receiving subsequent audio data from the user;
      accessing the user profile to retrieve the mutated phoneme mapping that is associated with the user; and
      using the mutated phoneme mapping to recognize the subsequent audio data received from the user.

2. The video game system of claim 1, wherein the processor is configured to execute the computer-executable instructions to perform the method further comprising:
   receiving information indicative of an accent of the user; and
   selecting the first phoneme mapping based on the information indicative of an accent.

3. The video game system of claim 2, wherein the information indicative of an accent includes at least one of:
   an age of the user;
   a gender of the user;
   a current location of the user; or
   a location where the user lived.

4. The video game system of claim 1, wherein the processor is configured to execute the computer-executable instructions to perform the method further comprising:
   changing a phoneme associated with one or more letters in the grammar training set;
   recognizing the speech sample using the mutated phoneme mapping;
   determining a second confidence score based on an analysis of the speech sample using the mutated phoneme mapping;
   comparing the second confidence score to the first confidence score; and
   based at least in part on the comparison of the second confidence score to the first confidence score, undoing a previous mutation and performing a different mutation to generate the mutated phoneme mapping.

5. The video game system of claim 1, wherein changing the first phoneme mapping to generate the mutated phoneme mapping until the confidence score generated using the mutated phoneme mapping satisfies the defined confidence threshold comprises:
   changing a phoneme associated with one or more letters in the grammar training set;
   recognizing the speech sample using the mutated phoneme mapping;
   determining a second confidence score based on an analysis of the speech sample using the mutated phoneme mapping;
   comparing the second confidence score to the first confidence score; and
   determining that the grammar training set is more accurately recognized using the mutated phoneme mapping as compared to using the first phoneme mapping.

6. The video game system of claim 1, wherein changing the first phoneme mapping comprises randomly changing one or more phoneme mappings.

7. The video game system of claim 1, wherein the first confidence score is a per phoneme confidence score.

8. A method for voice recognition as implemented by a computing system configured with specific computer-executable instructions, the method comprising:
   receiving a grammar training set;
   receiving a speech sample of a user reading at least a first portion of the grammar training set;
   determining a first phoneme mapping for each letter or combination of letters in the first portion of the grammar training set;
   recognizing the speech sample using the first phoneme mapping;
   determining a first confidence score indicative of how accurately the recognized speech sample corresponds to the first portion of the grammar training set by using the first phoneme mapping;
   changing the first phoneme mapping to generate a mutated phoneme mapping until a confidence score generated using the mutated phoneme mapping satisfies a defined confidence threshold;
   storing, in a user profile in a data store, the mutated phoneme mapping that satisfies the defined confidence threshold, wherein the mutated phoneme mapping is associated with the user in the user profile;
   receiving subsequent audio data from the user;
   accessing the user profile to retrieve the mutated phoneme mapping that is associated with the user; and
   using the mutated phoneme mapping to recognize the subsequent audio data received from the user.

9. The method of claim 8, further comprising:
   receiving information indicative of an accent of the user; and selecting the first phoneme mapping based on the information indicative of an accent.

10. The method of claim 9, wherein the information indicative of an accent includes at least one of:
- an age of the user;
- a gender of the user;
- a current location of the user; or
- a location where the user lived.

11. The method of claim 8, further comprising:
- changing a phoneme associated with one or more letters in the grammar training set;
- recognizing the speech sample using the mutated phoneme mapping;
- determining a second confidence score based on an analysis of the speech sample using the mutated phoneme mapping;
- comparing the second confidence score to the first confidence score; and
- based at least in part on the comparison of the second confidence score to the first confidence score, performing a different mutation to generate the mutated phoneme mapping.

12. The method of claim 8, wherein changing the first phoneme mapping to generate the mutated phoneme mapping until the confidence score generated using the mutated phoneme mapping satisfies the defined confidence threshold comprises:
- changing a phoneme associated with one or more letters in the grammar training set;
- recognizing the speech sample using the mutated phoneme mapping;
- determining a second confidence score based on an analysis of the speech sample using the mutated phoneme mapping;
- comparing the second confidence score to the first confidence score; and
- determining that the grammar training set is more accurately recognized using the mutated phoneme mapping as compared to using the first phoneme mapping.

13. The method of claim 8, wherein changing the first phoneme mapping comprises randomly changing one or more phoneme mappings.

14. The method of claim 8, further comprising:
- detecting a word in the subsequent audio data, wherein the word is not included in the grammar training set.

15. A non-transitory, computer-readable storage medium storing computer readable instructions that, when executed by one or more processors in a computing device, causes the computing device to perform operations comprising:
- receiving, through a network connection port, a speech sample of a user reading a grammar training set;
- determining a first phoneme mapping for each letter or combination of letters in the grammar training set;
- recognizing the speech sample using the first phoneme mapping;
- determining a first confidence score indicative of how accurately the grammar training set is recognized using the speech sample using the first phoneme mapping;
- changing the first phoneme mapping to generate a mutated phoneme mapping until a confidence score generated using the mutated phoneme mapping satisfies a defined confidence threshold;
- storing, in a user profile in a data store, the mutated phoneme mapping that satisfies the defined confidence threshold, wherein the mutated phoneme mapping is associated with the user in the user profile;
- receiving subsequent audio data from the user;
- accessing the user profile to retrieve the mutated phoneme mapping that is associated with the user; and
- using the mutated phoneme mapping to recognize the subsequent audio data received from the user.

16. The computer-readable storage medium of claim 15, wherein the computer readable instructions are further configured to cause the computing device to perform operations comprising:
- receiving information indicative of an accent of the user; and
- selecting the first phoneme mapping based on the information indicative of an accent.

17. The computer-readable storage medium of claim 16, wherein the information indicative of an accent includes at least one of:
- an age of the user;
- a gender of the user;
- a current location of the user; or
- a location where the user lived.

18. The computer-readable storage medium of claim 15, wherein the computer readable instructions are further configured to cause the computing device to perform operations comprising:
- changing a phoneme associated with one or more letters in the grammar training set;
- recognizing the speech sample using the mutated phoneme mapping;
- determining a second confidence score based on an analysis of the speech sample using the mutated phoneme mapping;
- comparing the second confidence score to the first confidence score; and
- based at least in part on the comparison of the second confidence score to the first confidence score, undo a previous mutation and performing a different mutation to generate the mutated phoneme mapping.

19. The computer-readable storage medium of claim 15, wherein changing the first phoneme mapping to generate the mutated phoneme mapping until the confidence score generated using the mutated phoneme mapping satisfies the defined confidence threshold comprises:
- changing a phoneme associated with one or more letters in the grammar training set;
- recognizing the speech sample using the mutated phoneme mapping;
- determining a second confidence score based on an analysis of the speech sample using the mutated phoneme mapping;
- comparing the second confidence score to the first confidence score; and
- determining that the grammar training set is more accurately recognized using the mutated phoneme mapping as compared to using the first phoneme mapping.

20. The computer-readable storage medium of claim 15, wherein the first confidence score is a per word confidence score.

* * * * *